(12) United States Patent
Sheh et al.

(10) Patent No.: US 6,614,618 B1
(45) Date of Patent: Sep. 2, 2003

(54) DISK DRIVE WITH FEED-FORWARD CONTROL PATH THAT RECEIVES A REFERENCE POSITION SIGNAL TO APPLY A FEED-FORWARD COMMAND EFFORT AT A RATE GREATER THAN A SERVO SAMPLING RATE

(75) Inventors: Edgar D. Sheh, Cupertino, CA (US); Thao P. Trieu, Redwood City, CA (US); Ara W. Nazarian, Tustin, CA (US); Richard K. Wong, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 09/538,931

(22) Filed: Mar. 31, 2000

(51) Int. Cl.$^7$ ................................................ G11B 5/596
(52) U.S. Cl. .................................................... 360/78.09
(58) Field of Search ............................ 360/78.09, 78.04

(56) References Cited

U.S. PATENT DOCUMENTS

| | | | |
|---|---|---|---|
| 4,775,903 A | * 10/1988 | Knowles | ...................... 360/78 |
| 5,721,648 A | 2/1998 | Phan et al. | |
| 5,859,742 A | 1/1999 | Takaishi | |

* cited by examiner

Primary Examiner—David Hudspeth
Assistant Examiner—Mitchell Slavitt
(74) Attorney, Agent, or Firm—Milad G. Shara, Esq.; Myers Dawes Andras & Sherman (57) ABSTRACT

Disclosed is a disk drive having a plant with a moveable transducer and a servo controller that more precisely controls the transducer during short to medium seeks by producing a multi-rate feed-forward command effort signal. The servo controller includes a reference position generator that provides a reference position signal that varies as a function of time along a shaped position profile for moving the transducer from a start position to a target position in a smoothly controlled fashion, a feed-forward control path that receives the reference position signal and applies a feed-forward command effort signal at a feed-forward rate that is greater than the servo sampling rate to move the actuator more closely along the shaped position profile between servo samples; and a feedback control path that receives the reference position signal and the indicated position signal and applies a feedback command effort signal at the servo sampling rate based on a difference between the reference position signal and the indicated position signal to make minor corrections to error remaining after application of prior feed-forward command effort signals.

20 Claims, 5 Drawing Sheets

| Seek Length (tracks) | (feed-forward duration in samples) |
|---|---|
| 1-2 | 6 |
| 3-15 | 10 |
| 16-35 | 14 |
| 36-80 | 20 |
| 81-160 | 28 |

Figure 4

1-2 track Seeks

| sample k | reference position multiplier r(k) | FF1 | FF2 | FF3 | FF4 |
|---|---|---|---|---|---|
| 1 | 32767 | 8168 | 11118 | 14628 | 14772 |
| 2 | 32704 | 13992 | 11438 | 8274 | 4564 |
| 3 | 27992 | 927 | -2445 | -5260 | -7437 |
| 4 | 16507 | -8900 | -9695 | -9858 | -9520 |
| 5 | 6261 | -8736 | -7705 | -6357 | -5120 |
| 6 | 1118 | -3354 | -2156 | -1198 | -479 |

Figure 5

3-15 Track Seeks

| sample k | reference position multiplier r(k) | FF1 | FF2 | FF3 | FF4 |
|---|---|---|---|---|---|
| 1 | 32767 | 1821 | 2713 | 3910 | 4567 |
| 2 | 32746 | 5132 | 5346 | 5372 | 5151 |
| 3 | 31606 | 4759 | 4205 | 3540 | 2793 |
| 4 | 27577 | 2003 | 1198 | 410 | -332 |
| 5 | 21453 | -1008 | -1613 | -2138 | -2577 |
| 6 | 14633 | -2927 | -3187 | -3363 | -3457 |
| 7 | 8695 | -3476 | -3429 | -3322 | -3165 |
| 8 | 4362 | -2965 | -2733 | -2473 | -2198 |
| 9 | 1836 | -1904 | -1617 | -1306 | -1042 |
| 10 | 652 | -692 | -445 | -247 | -99 |

DISK DRIVE WITH FEED-FORWARD CONTROL PATH THAT RECEIVES A REFERENCE POSITION SIGNAL TO APPLY A FEED-FORWARD COMMAND EFFORT AT A RATE GREATER THAN A SERVO SAMPLING RATE

FIELD OF THE INVENTION

The invention relates generally to magnetic disk drives and, more particularly, to a disk drive with a sampled servo control system with a feed-forward control path that outputs a feed-forward control. The result is a closer approximation to a desired seek profile that provides a quieter faster seek over short to medium seek lengths.

BACKGROUND OF THE RELATED ART

Magnetic disk drives generally read and write data on the surface of a rotating magnetic disk with a transducer that is located at the far end of a moveable actuator. A servo control system uses servo control information recorded amongst the data, or on a separate disk, to controllably move the actuator from track to track ("seeking") and to hold the actuator at a desired position ("track following"). A detailed discussion of servo control systems is unnecessary because such systems are well known as set forth, for example, in patent application Ser. No. 09/138,841 now U.S. Pat. No. 6,204,988 that was filed on Aug. 24, 1998, entitled "DISK DRIVE CAPABLE OF AUTONOMOUSLY EVALUATING AND ADAPTING THE FREQUENCY RESPONSE OF ITS SERVO CONTROL SYSTEM," and is commonly owned by the assignee of this application.

Most disk drives have previously been used for storing conventional data files of the type that are associated with personal computers. In such applications, data integrity is paramount relative to other considerations such as seek times and the reduction of acoustic noise. Disk drives, however, are becoming popular for recording and replaying audiovisual data—e.g. a drive based recording device that replaces a video cassette recorder (VCR). A drive-based recording device of this nature will benefit from using a disk drive with faster seek times because it will spend less time moving its actuator where it needs to be and more time recording or recovering information such that it may be able to record and/or playback more audiovisual data streams than otherwise possible. At the same time, a drive-based recording device is likely to be located adjacent to a television or be in some other location where acoustic noise is undesirable. Accordingly, it is equally important for the disk drive to implement its seeks as quietly as possible.

The drive industry has progressed through several stages of development as related to seeks. Of relevance here, is the prior use of a so-called "bang bang" seek profile wherein the transducer is rapidly accelerated at the start of a seek and then rapidly decelerated at the end of a seek. A bang-bang seek profile moves the transducer to a target position in as rapid a manner as possible. On the other hand, since the bang-bang profile is a square wave, it contains many high frequency components that may overlap with and detrimentally excite a mechanical resonance that causes the transducer to take longer to settle into the target position. It has previously been determined that a quieter, more efficient seek is possible by "shaping" the transducer's acceleration profile so that it does not appear like a square wave, but rather approximates a single frequency sine wave. The result is a shaped seek profile that is "close" to a bang-bang square wave that does not contain the high frequency components that may excite the drive's resonant frequencies.

Modern disk drives, however, generally use a sampled servo control system that only periodically receives position information (e.g. once per servo sector) and shortly thereafter outputs a corrective feedback command effort signal based on a deviation between the indicated position and the target position. Accordingly, the drive's ability to provide a shaped acceleration profile during a given seek is limited by the fact that such drive must make a piecewise approximation of that profile with a finite number of command efforts. The more servo sectors encountered during the seek, the more command efforts and the better the approximation. The longer the seek, the better the approximation as well. Accordingly, the sinusoidal seek profile is approximated quite well on longer seeks (e.g. 1,000 tracks or more), but tends to appear quite unlike a sine wave for medium seeks (e.g. 256 to 1,000 tracks) and for short seeks (e.g. 1 to 255 tracks). A "full stroke" seek length in a modern drive is in the order of 10,000 tracks such that the short to medium strokes referenced herein are substantially less than a full stroke. A short seek that might be accomplished in only four or five samples, for example, tends to warp the sinusoid into something more akin to a triangle wave that is more abrupt, acoustically louder, and contains more energy in the higher frequency components that may excite a resonance and extend settling time. As a result, conventional disk drives tend to take longer than necessary to settle and be louder than necessary during short to medium seeks.

There remains a need, therefore, for a disk drive that implements short to medium seek lengths with less settling time and less acoustic noise, i.e. is faster and quieter and more suitable, therefore, for audiovisual applications.

SUMMARY OF THE INVENTION

In a first aspect, the invention resides in a disk drive comprising a plant having a transducer that periodically samples servo position information recorded on the disk at a servo sampling rate to produce an indicated position signal, and a voice coil motor adapted for moving the transducer in response to a total command effort signal; and a servo controller that generates the total command effort signal for moving the transducer from a start position to a target position. In this first aspect, the servo controller comprises a reference position generator that provides a reference position signal having a continuous rate of change for moving the transducer from the start position to the target position in a controlled fashion; a feedback control path that receives the reference position signal and the indicated position signal and applies a feedback command effort signal at the servo sampling rate based on a difference between the reference position signal and the indicated position signal; and a feed-forward control path that includes a multi-rate state machine and receives the reference position signal and applies a feed-forward command effort signal at a feed-forward rate that is greater than the servo sampling rate to move the transducer more closely along the shaped position.profile between servo samples.

In a second aspect, the invention resides in a disk drive comprising a plant having a transducer that periodically samples servo position information recorded on the disk at a servo sampling rate to produce an indicated position signal, and a voice coil motor adapted for moving the transducer in response to a total command effort signal; and a servo controller that generates the total command effort signal for moving the transducer from a start position to a target position. In this second aspect, the servo controller comprises a reference position generator that provides a reference position signal having a continuous rate of change for moving the transducer from the start position to the target position in a controlled fashion; and a feed-forward control path that includes a multi-rate state machine and receives the reference position signal and applies a feed-forward command effort signal at a first feed-forward rate that is greater than the servo sampling rate to move the transducer more closely along the shaped motion profile between servo samples for a first seek length that is less than a predetermined seek length and at a second feed-forward rate that is equal to the servo sampling rate for a second seek length that is longer than the predetermined seek length.

In a second aspect, the invention resides in a disk drive comprising a microprocessor for executing servo and non-servo programs; a disk having recorded servo position information; a transducer for periodically sampling the recorded servo position information at a servo sampling rate to produce an indicated position signal; and a servo controller that generates a total command effort signal for moving the transducer from a start position to a target position. In accordance with this aspect of the invention, the servo controller comprises a reference position generator that provide a reference position signal that varies as a function of time along a shaped position profile for moving the transducer from the start position to the target position in a controlled fashion; a feedback control path that receives the reference position signal and the indicated position signal and applies a feedback command effort signal at the servo sampling rate based on a difference between the reference position signal and the indicated position signal; and a feed-forward state machine that receives the reference position signal and concurrent with the execution of non-servo programs by the microprocessor, autonomously applies a feed-forward command effort signal at a feed-forward rate that is greater than the servo sampling rate to move the transducer more closely along the shaped position profile between servo samples.

BRIEF DESCRIPTION OF THE DRAWINGS

The just summarized invention can be best understood with reference to the following description taken in view of the drawings of which.

DETAILED DESCRIPTION OF THE PREFERRED EMBODIMENT

Figure 1:
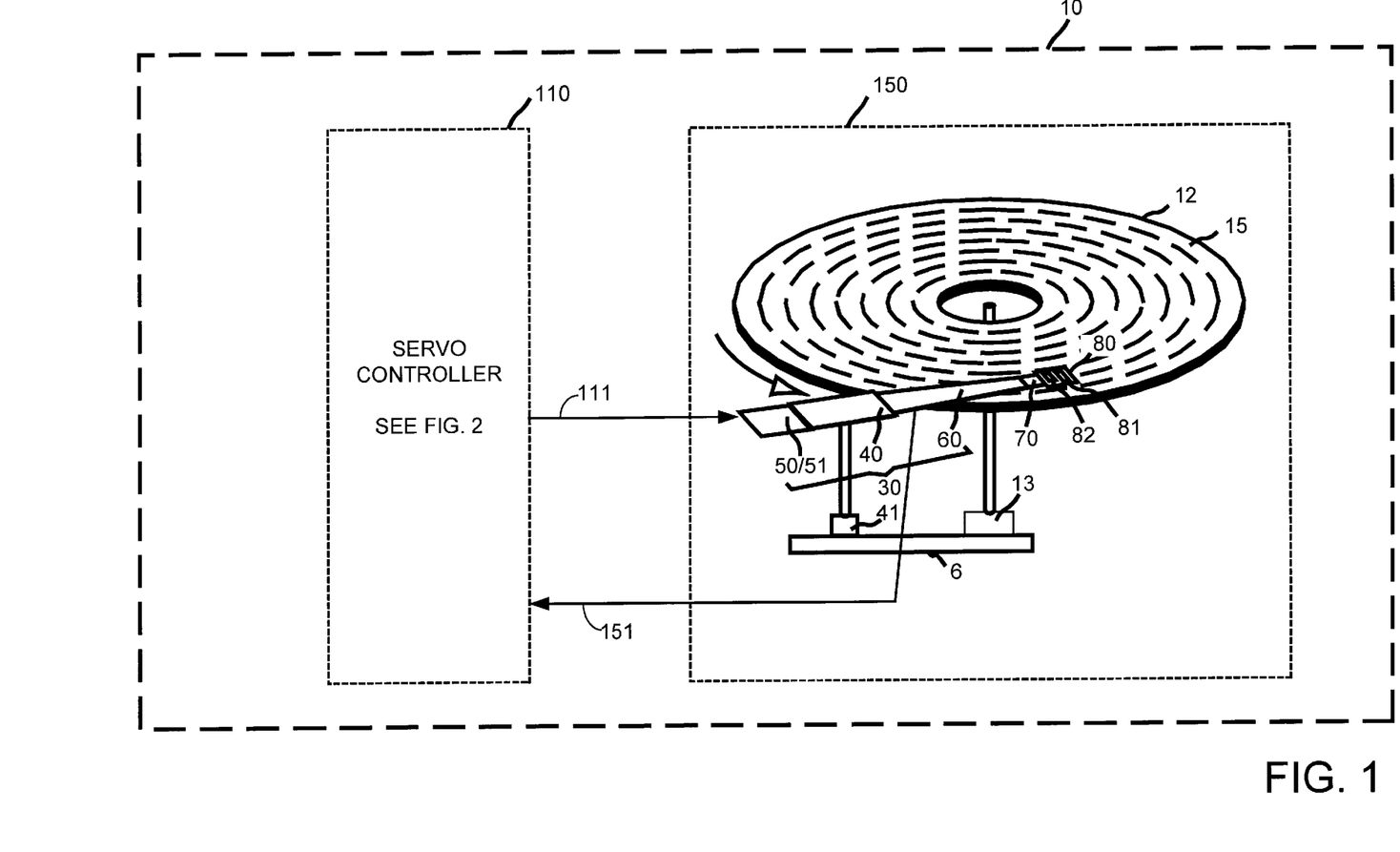
FIG. 1 is a block diagram of a disk drive having a servo controller and disk drive plant according to this invention, with emphasis on the components of the plant.
Figure 2:
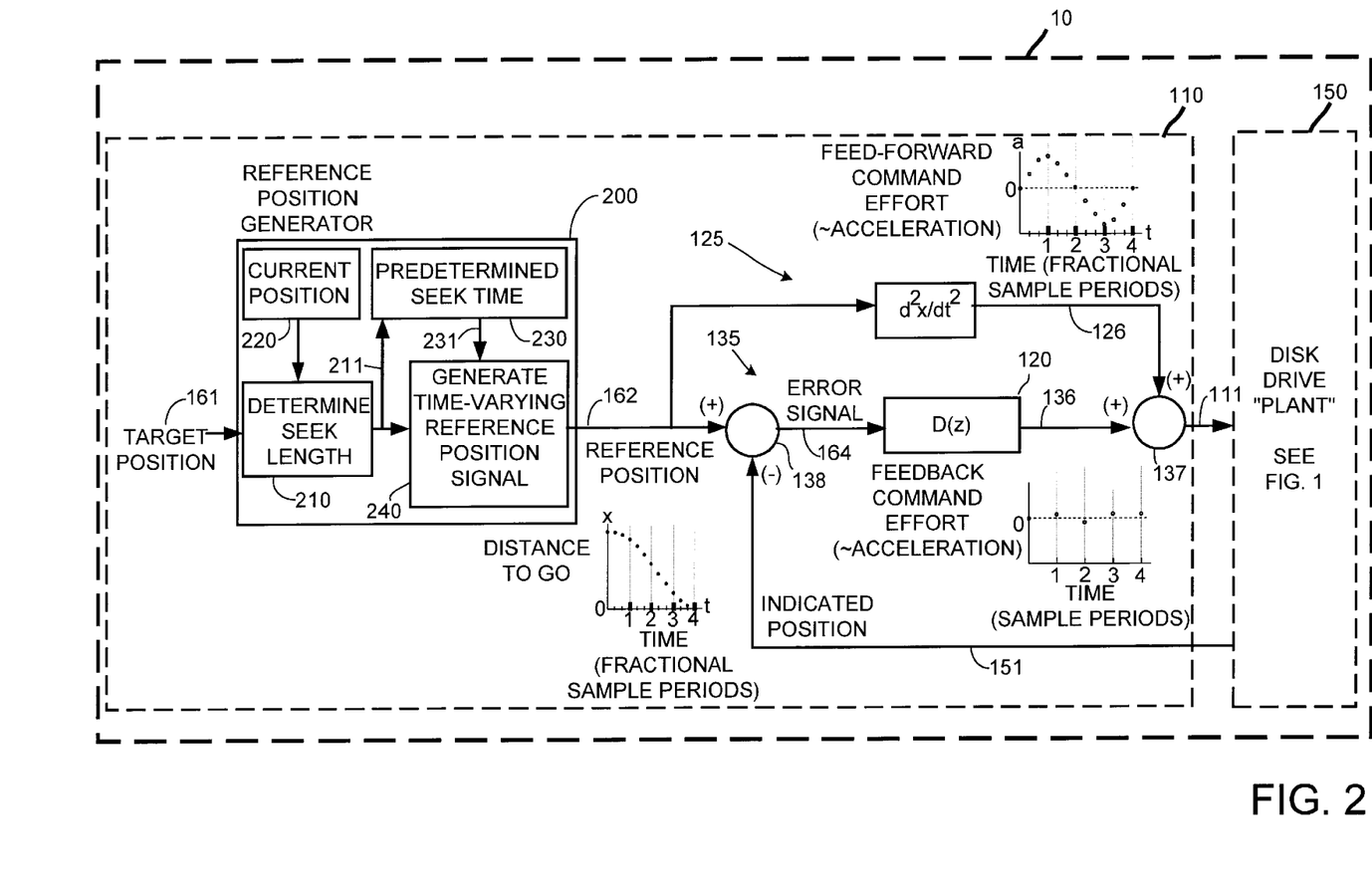
FIG. 2 is block diagram of the disk drive with emphasis on the components of the servo controller.

As shown in FIGS. 1 and 2, a disk drive 10 according to this invention generally comprises a servo controller 110 and a disk drive "plant" 150. FIG. 1 emphasizes the details of the plant 150 and FIG. 2 emphasizes the details of the servo controller 110 including a multi-rate feed-forward control path 125 as discussed further below.

As shown in FIG. 1, the plant 150 generally comprises a base 6, a spindle motor 13 connected to the base 6, and a magnetic disk 12 connected to the spindle motor 6 (only one is shown, but there are generally two or more disks). The plant 150 also includes a swing-type actuator 30 consisting of a pivot body 40 that rotates on a pivot cartridge 41, a voice coil motor 50/51 (e.g. a coil 50 and permanent magnets 51) extending to one side of the pivot body 40, an actuator arm 60 extending from the other side of the pivot body 40, and a head gimbal assembly (HGA) 70 that includes a transducer 80. The particular transducer 80 shown includes separate read and write transducers 81, 82 as found in a magnetoresistive head (MR head), but single transducer heads such as a conventional inductive head (not shown) may also be used.

The VCM 50/51 moves the swing-type actuator 30 in response to a total command effort signal 111 received from the servo controller 110 and the transducer 80 periodically samples servo position information 15 recorded on the disk 12 at a servo sampling rate to produce an indicated position signal 151. The servo sampling rate is determined by the number of servo sectors per revolution and the rotational speed of the disk 12.

FIG. 2 is a block diagram of the servo controller 110 that receives the indicated position signal 151 and generates the total command effort signal 111 provided to the disk drive's VCM 50/51 for moving the swing-type actuator 30 to a target position 161. In more detail, the servo controller 110 comprises a reference position generator 200 that receives the target position 161 and provides a reference position signal 162 that varies as a function of time along a shaped position profile 163 for moving the transducer 80 (see FIG. 1) from a start position to the target position in a controlled fashion.

The reference position signal 162 is provided to a feed-forward control path 125 and to a feedback control path 135. The feed-forward control path 125 receives the reference position signal 162 and applies a feed-forward command effort signal 126 at a feed-forward rate that is greater than the servo sampling rate—i.e. multi-rate—to move the actuator 30 more closely than otherwise possible along the shaped position profile 163, between servo samples, during short seeks when relatively few servo samples are available.

The feedback control path 135 includes a combining junction 138 at its input that receives the reference position signal 162 and the indicated position signal 151 and applies a feedback command effort signal 136 at the servo sampling rate based on an error signal 164 representing the difference between the reference position signal 162 and the indicated position signal 151. The feedback control path 135, in essence, generally makes minor corrections at the servo sampling rate to compensate for any error remaining after application of prior multi-rate feed-forward command effort signals 126.

Ultimately, as shown in FIG. 2, a combining junction 137 combines the feedback command effort signal 136 with the feed-forward command effort signal 126 to form the total command effort signal 111 that is provided to the VCM 50/51. As already noted, the feed-forward command effort signal 126 is multi-rate, i.e. is produced at a rate that exceeds the basic servo sampling rate. The feed-forward rate is preferably an integer multiple of the servo sampling rate such as 2×, 3×, or 4× the servo sampling rate. Accordingly, the total command effort signal 111 consists most frequently of the feed-forward command effort signal 126 alone, and less frequently of a feed-forward command effort signal 126 combined with a feedback command effort signal 136.

The operation just described may be better understood with reference to the conceptual graphs 163, 167, 169 that are included in FIG. 2 and by remembering that the goal is to provide the plant 150 with a total command effort signal 111 that closely approximates a particular acceleration profile while effecting short to medium seeks that are, for example respectively, from 1 to 255 tracks and from 256 to 1,000 tracks in length. The preferred acceleration profile is a sinusoid because it contains only one frequency, but it might be desirable to vary somewhat from an exact sinusoid for even more improved settling. In either case, the primary contributor to the acceleration profile is the feed-forward command effort signal 126.

The conceptual graph 167 above the signal line carrying the feed-forward command effort signal 126 shows that it has an effort expended (which translates to acceleration "a") versus time profile (a "shaped effort profile") that is sinusoidal.

The conceptual graph 163 below the signal line carrying the reference position signal 162 shows that it has a "distance-to-go" versus time profile (a "shaped position profile") that varies from an initial distance-to-go to zero during a period of time corresponding to the anticipated number of servo samples needed to implement the seek (four in this case).

The feed-forward command effort signal 126 is, of course, related to the reference position signal 162 by the transfer function of the feed-forward control path 125. As shown in FIG. 2, the transfer function of the preferred feed-forward control path 125 is simply a double time derivative of the reference position signal 162, i.e. $d^2x/dt^2$. The transfer function, however, could be more complicated if desired. In particular, the transfer function might include an inverse plant model such that the plant's response to the feed-forward command effort signal 126 more closely matches the ideal.

The reference position generator 200 generates a reference position signal 162 that produces a sinusoidal feed-forward command effort signal 126. The reference position signal 162, in other words, is the double integral of a sinusoid. As a result, for a given short to medium seek, the reference position generator 200 outputs a reference position signal 162 that, when processed by the feed-forward control path 125, produces a feed-forward command effort signal 126 that is sinusoidal. In the preferred embodiment, the feed-forward command effort signal 126 is derived from a pre-computed lookup table that is indexed by the reference position signal 162.

The feedback control path 135, unlike the feed-forward control path 125, only produces an output at the servo sampling rate as suggested by the graph 169 that appears below the signal line carrying the feedback command effort signal 136. In essence, the feedback control path 135 serves to correct any deviation between the expected position and the indicated position after application of the feed-forward command effort signal 126 due to modeling errors and/or perturbations. The feedback control path 135 includes a compensator 120 that implements a transfer function D(z) that generally accounts for the modeled frequency response of the plant 150. Compensator 120 is well known in the art therefore a detailed description is unnecessary to appreciate the present invention.

The reference position generator 200 is amenable to many embodiments. As suggested by FIG. 2, however, the preferred reference position generator 200 is implemented with firmware including functional blocks 210 that determines a seek length based on the difference between the target position 161 and a current position 220. The reference position generator 200 then provides the seek length 211 to a functional block 230 that determines a corresponding seek time 231 (e.g. by way of a lookup table). Finally, both the seek length 211 and the seek time 231 are provided a generating block 240 that produces the reference position signal 162.

In the preferred embodiment, the reference position generator 200 includes reference position signals that have been pre-computed (e.g. number of sample periods $T_s$ and corresponding position values). Seek lengths such as 1, 2, 4, 8 and 16 tracks, for example, have been set to 4, 4, 6, 12 and 16 sample periods $T_s$, respectively. In like fashion, the feed-forward values defining the feed-forward command effort signal 126 are also pre-computed.

Figure 3:
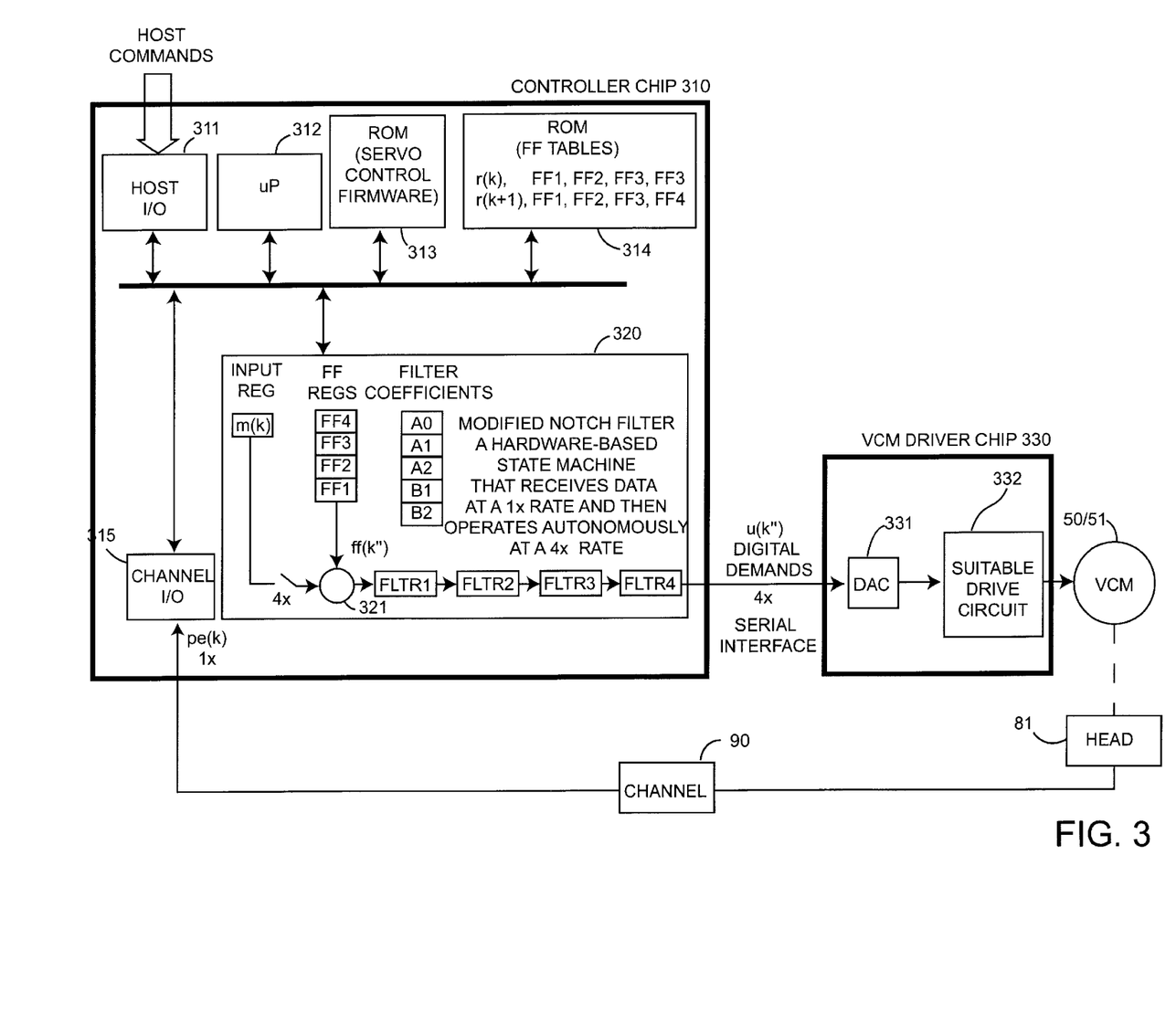
FIG. 3 is a block diagram of a representative control loop embodiment wherein the reference position signal r(k) for each sample period and the related feed-forward values FF1, FF2, FF3, and FF4 (four in this embodiment) are stored in suitable tables and provided to a suitable hardware-based state machine 220 for output as multi-rate digital demands u(k") at a 4×rate.

FIG. 3 is a block diagram of a preferred control loop wherein the reference position signal r(k) for each sample period and the related feed-forward values FF1, FF2, FF3, and FF4 (four in this embodiment) are stored in suitable tables and provided to a state machine 220 for output as multi-rate digital demands u(k"). As shown, the control loop comprises a controller chip 310, a VCM driver chip 330, the VCM 50/51, the head 80, and a read channel 90. In this particular embodiment, the functional equivalent of the servo controller 110 of FIG. 1 is implemented by suitable portions of the controller chip 310 and the VCM driver chip 330.

The controller chip 310, in particular, includes a microprocessor 312 for executing servo and non-servo programs. The microprocessor, for example, executes a servo control algorithm stored in a read-only memory (ROM) 313. The controller chip 310 receives host commands from a host (not shown) via a host I/O block 311 and receives an indicated position signal pe(k) from the channel 90 via a channel I/O block 315.

The controller chip 310 would ordinarily develop a total command effort based on the difference m(k) between the target position and the indicated position signal 151. Here, however, the controller chip 310 uniquely includes a table ROM 314 and a multi-rate state machine 320 that, concurrent with the execution of non-servo programs by the microprocessor 312, autonomously applies a feed-forward command effort signal at a feed-forward rate that is greater than the servo sampling rate to move the transducer more closely along the shaped position profile between servo samples.

The preferred state machine 320 also implements, as suggested by FIG. 3, a notch filter function that dampens mechanical resonances while outputting multi-rate demands u(k") based on the feed-forward values stored in the table ROM 314. In particular, after a servo wedge has been read and an indicated position 151 has been returned by the channel 90, the servo control firmware, which is running on the microprocessor 312, accesses the appropriate data in the table ROM 314, calculates a demand value m(k) by subtracting the indicated position 151 from a suitably scaled version of the reference position signal r(k), and then loads the demand value m(k) (ideally zero) and the feed-forward values FF1, FF2, FF3, FF4 into corresponding registers in the state machine 320. The state machine 320 thereafter process these values at a 4×rate in order to output four successive digital demands u(k") at a 4×rate based on the demand value m(k) and the feed-forward values FF1, FF2, FF3, FF4.

The preferred state machine is a notch filter implemented as a second order digital filter that operates according to this equation:

$$u(k")=A_0 n(k")+A_1 n(k"-1)-B_1 u(k"-1)-B_2 u(k"-2)$$

where $n(k")$ is the input to the filter, $u(k")$ is the output of the filter, and $A_0, A_1, A_2, B_1$ and $B_2$ are constant coefficients that determine the behavior of the filter.

The overall filter uses a chain of four filters FLTR1, FLTR2, FLTR3, FLTR4. In operation, the state machine 320 is oversampled at a 4×rate (as compared with the servo sample rate) and the first filter FLTR1 is provided with a combination of the feedback-computed demand value $m(k)$ and the following sequence of four inputs $n_1(k)$ as suggested by the combining junction 321 of FIG. 3:

$$n_1(k")=m(k")+FF1$$

$$n_1(k"+1)=m(k")+FF2$$

$$n_1(k"+1)=m(k")+FF3$$

$$n_1(k"+1)=m(k")+FF4$$

The output of each filter feeds the input of the next such that:

$$n_2(k")=u_1(k")$$

$$n_3(k")=u_2(k")$$

$$n_4(k")=u_3(k")$$

The VCM driver chip 330 contain a DAC 331 that receives the digital demands u(k") from the state machine 320 and converts them to an analog value (typically a voltage) that is further provided to a suitable drive circuit 332 that drives the VCM 50/51 (typically with current).

Figure 4:
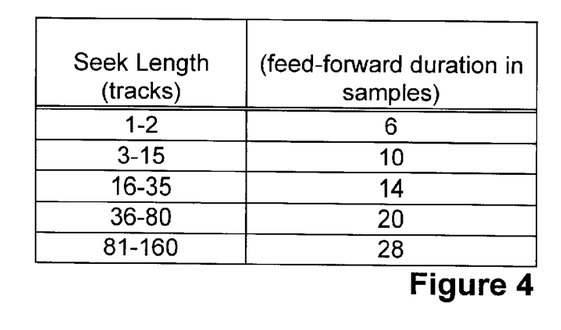
FIG. 4 is a table representing the feed-forward durations for short to medium length seeks from as little as 1 track to as many as 160 tracks, that overall range being divided into five different sub-ranges.

FIG. 4 is a table representing the feed-forward durations for short to medium length seeks from as little as 1 track to as many as 160 tracks. The overall range of tracks from 1 to 160 is divided into five different sub-ranges that have difference feed-forward durations ranging from 6 to 28 samples k.

Figure 5:
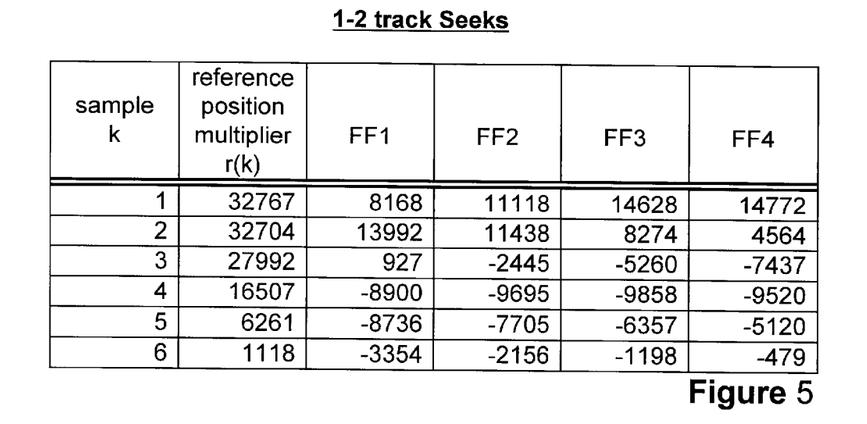
FIG. 5 is a representative feed-forward table used for 1–2 track seeks, the first column representing the sample k (servo wedge), the second column representing the reference position signal r(k), and the third through sixth columns representing the feed-forward values that are used to output 4×demands u(k") between 1×servo samples.
Figure 6:
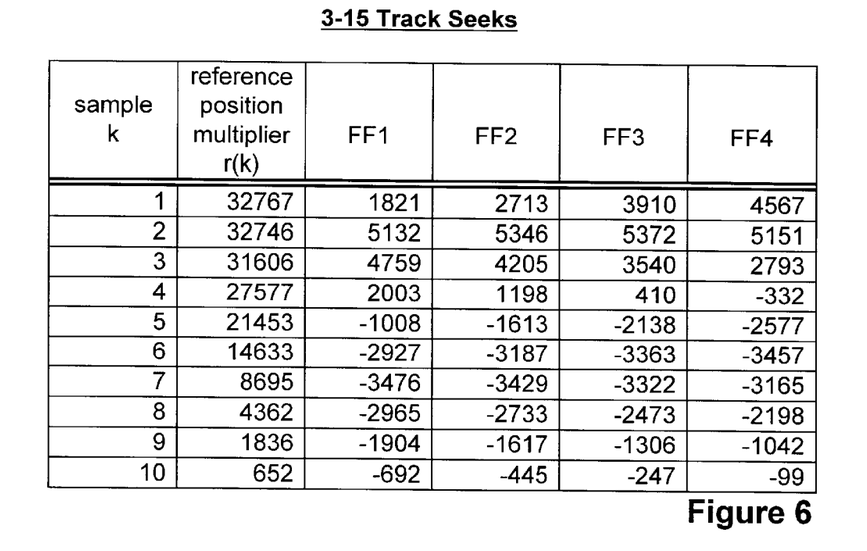
FIG. 6 is a representative feed-forward table used for 3–15 track seeks, the remaining tables being longer but similarly configured.

FIG. 5 represents a first one of the five feed-forward tables that are stored in the table ROM 314, this one used for 1–2 track seeks. The first column represents the sample k (servo wedge), the second column represents the reference position signal r(k), and the third through sixth columns represent the feed-forward values FF1, FF2, FF3, FF4 that are used to output demands u(k") at a 4×rate, in between servo samples that are received at a 1×rate. FIG. 6 is a representative feed-forward table used for 3–15 track seeks. The other three tables (not shown) are longer but are otherwise similarly configured.

Figure 7:
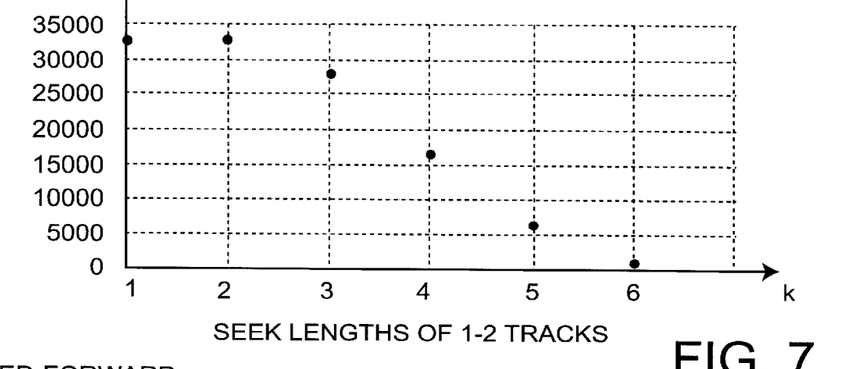
FIG. 7 is a plot of the reference position signal r(k) from the 1–2 track seek table of FIG. 5, the reference position signal r(k) being used as is for a 1 track seek and scaled by a factor of 2 for a 2 track seek.

FIG. 7 is a plot of the reference position signal r(k) from the 1–2 track seek table of FIG. 5. The values for the reference position signal r(k) provide maximum resolution given a 16-bit two's complement representation and are normalized to a one track seek. The reference position signal r(k) is used without modification, therefore, for a 1 track seek and is scaled by a factor of 2 for a 2 track seek. The other tables are similarly normalized to a one track seek such that the values of the reference position signal r(k) are conveniently scaled in a like manner.

Figure 8:
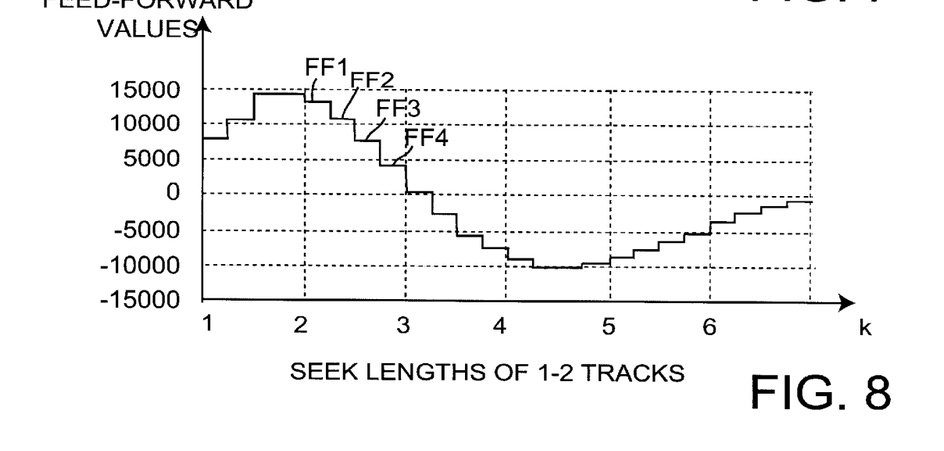
FIG. 8 is a plot of the feed-forward values from the 1–2 track seek table of FIG. 5, the feed-forward values being used as is for a 1 track seek and scaled by a factor of 2 for a 2 track seek.

FIG. 8 is a plot of the feed-forward values from the 1–2 track seek table of FIG. 5. The four feed-forward values FF1, FF2, FF3, FF4 associated with the second sample period (k=2) are identified on the graph. The feed-forward values are also normalized to a one-track situation so that they are easily scaled for seeks of various lengths. Note that in this actual case, the acceleration profile represented by FIG. 8 is a modified sinusoid that has been found to provide better performance than a true sinusoid.

We claim:

1. A disk drive comprising:
   a plant having a disk and a transducer that periodically samples servo position information recorded on the disk at a servo sampling rate to produce an indicated position signal, and a voice coil motor adapted for moving the transducer in response to a total command effort signal; and
   a servo controller that generates the total command effort signal for moving the transducer from a start position to a target position, the servo controller comprising:
      a reference position generator that provides a reference position signal having a continuous rate of change for moving the transducer from the start position to the target position in a smoothly controlled fashion;
      a feedback control path that receives the reference position signal and the indicated position signal and applies a feedback command effort signal at the servo sampling rate based on a difference between the reference position signal and the indicated position signal; and
      a feed-forward control path that includes a multi-rate state machine and receives the reference position signal and applies a feed-forward command effort signal at a feed-forward rate that is greater than the servo sampling rate to move the transducer more closely along the shaped position profile between servo samples.

2. The disk drive of claim 1 further comprising a combining junction for combining the feedback command effort signal with the feed-forward command effort signal to form the total command effort signal.

3. The disk drive of claim 1 wherein the feed-forward command effort signal varies as a function of time along a shaped effort profile and wherein the shaped effort profile is a double integral of the shaped position profile.

4. The disk drive of claim 3 wherein the shaped effort profile is a single frequency sinusoid that reduces resonant excitations of the plant.

5. The disk drive of claim 1 wherein the reference position generator and the feed-forward control path are limited for use in seek operations having a limited range of seek lengths.

6. The disk drive of claim 5 wherein the limited range is substantially less than a full stroke.

7. The disk drive of claim 6 wherein the limited range is less than 1000 tracks.

8. The disk drive of claim 1 wherein the feed-forward rate is an integer multiple of the servo sampling rate.

9. The disk drive of claim 8 wherein the feed-forward rate is two times the servo sampling rate.

10. The disk drive of claim 8 wherein the feed-forward rate is three times the servo sampling rate.

11. The disk drive of claim 8 wherein the feed-forward rate is four times the servo sampling rate.

12. A disk drive comprising:
   (1) a plant having a transducer that periodically samples servo position information recorded on the disk at a servo sampling rate to produce an indicated position signal, and a voice coil motor adapted for moving the transducer in response to a total command effort signal; and
   (2) a servo controller that generates the total command effort signal for moving the transducer from a start position to a target position corresponding to a seek length, the servo controller comprising:
      (a) a reference position generator that provides a reference position signal having a continuous rate of change for moving the transducer from the start position to the target position in a smoothly controlled fashion; and
      (b) a feed-forward control path that includes a multi-rate state machine and receives the reference position signal and applies a feed-forward command effort signal at a first feed-forward rate that is greater than the servo sampling rate to move the transducer more closely along the shaped position profile between servo samples for a first seek length that is less than a predetermined seek length and at a second feed-forward rate that is equal to the servo sampling rate for a second seek length that is longer than the predetermined seek length.

13. The disk drive of claim 12 wherein the servo controller further comprises a feedback control path that receives the reference position signal and the indicated position signal and applies a feedback command effort signal at the servo sampling rate based on a difference between the reference position and the indicated position to make minor corrections to any error remaining after application of prior feed-forward command effort signals.

14. The disk drive of claim 12 wherein the predetermined seek length is substantially less than a full stroke.

15. The disk drive of claim 12 wherein the predetermined seek length is 1,000 tracks.

16. The disk drive of claim 12 wherein the first feed-forward rate is an integer multiple of the servo sampling rate.

17. The disk drive of claim 16 wherein the first feed-forward rate is two times the servo sampling rate.

18. The disk drive of claim 16 wherein the feed-forward rate is three times the servo sampling rate.

19. The disk drive of claim 16 wherein the first feed-forward rate is four times the servo sampling rate.

20. A disk drive comprising:
   a microprocessor for executing servo and non-servo programs;
   a disk having recorded servo position information;
   a transducer for periodically sampling the recorded servo position information at a servo sampling rate to produce an indicated position signal; and
   a servo controller that generates a total command effort signal for moving the transducer from a start position to a target position, the servo controller comprising:
      a reference position generator that provide a reference position signal that varies as a function of time along a shaped position profile for moving the transducer from the start position to the target position in a controlled fashion;
      a feedback control path that receives the reference position signal and the indicated position signal and applies a feedback command effort signal at the servo sampling rate based on a difference between the reference position signal and the indicated position signal; and
      a feed-forward state machine that receives the reference position signal and concurrent with the execution of non-servo programs by the microprocessor, autonomously applies a feed-forward command effort signal at a feed-forward rate that is greater than the servo sampling rate to move the transducer more closely along the shaped position profile between servo samples.

* * * * *